F. G. KEYES & C. A. KRAUS.
SEAL FOR FUSED SILICATE CONTAINERS.
APPLICATION FILED APR. 10, 1911.
1,014,757. Patented Jan. 16, 1912.
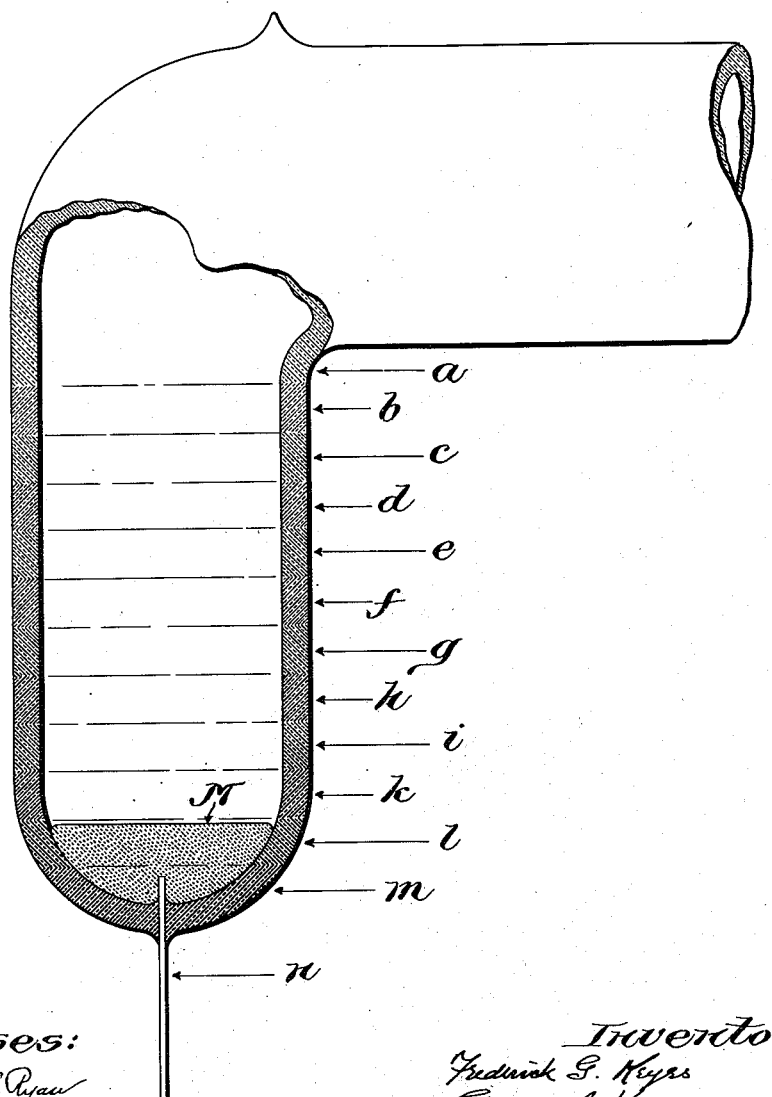

UNITED STATES PATENT OFFICE.

FREDERICK G. KEYES, OF BOSTON, AND CHARLES A. KRAUS, OF NEWTON HIGHLANDS, MASSACHUSETTS.

SEAL FOR FUSED-SILICATE CONTAINERS.

1,014,757.  Specification of Letters Patent.  Patented Jan. 16, 1912.

Application filed April 10, 1911. Serial No. 619,966.

*To all whom it may concern:*

Be it known that we, FREDERICK G. KEYES and CHARLES A. KRAUS, both citizens of the United States, and residents, respectively, of Boston and Newton Highlands, in the counties of Suffolk and Middlesex and State of Massachusetts, have invented new and useful Improvements in Seals for Fused-Silicate Containers, of which the following is a specification.

Our invention relates to the construction of vacuum electric apparatus of which the container is composed of fused silica, and the object of our invention is to provide fused silica containers with adequate and permanent vacuum tight seals for the leading-in wires.

The transparency of fused silica to the shorter light waves and to ultra-violet waves, constitutes this material an admirable one for many purposes. The mercury arc is a copious source of ultra-violet rays, and therefore it has become very desirable to utilize fused silica in the construction of the containers for mercury-arc lamps. Moreover, the strength and toughness of fused silica would have led to its adoption in the construction of other vacuum electric apparatus were it not for the difficulties presented in the construction and maintenance of an adequate vacuum tight seal for the leading-in wires of such apparatus. The low thermal coefficient of expansion of silica which on many accounts is an advantage, and recommends it as a material for the containers of vacuum electric apparatus, is one of the chief factors operating to prevent the use of this material to the extent desired, since it has not heretofore been possible to make a fused and hermetical vacuum tight seal, either directly or indirectly, between the silica and the metal of which the leading-in connection is composed. Moreover, the high fusing temperature of silica would render it practically impossible to seal a metal lead directly to the silica, since even platinum fuses at a lower temperature than that at which silica becomes fully plastic. So far as we are informed, these inherent physical properties of fused silica which render it so desirable as a material for the construction of containers for vacuum electric apparatus, have heretofore constituted on the other hand what have appeared to be insuperable obstacles to the thoroughly successful utilization of silica for these purposes.

The thermal coefficient of expansion of silica is only about one-fifteenth of that of platinum, so that it is obvious that direct sealing of a platinum lead to a silica container is impossible even if the difficulty due to the high fusing temperature of silica could be overcome. Nor is there any other metal that can be employed for this purpose or which is capable of being sealed directly in a silica container. It is true there are some nickel steel alloys which have a very low coefficient of expansion but this is a variable coefficient which rises with temperature; and again, the melting point of such metals lies well below the melting point of silica. Vacuum electric apparatus having quartz containers have been constructed, the leads being sealed by making a close mechanical fit between metal and silica and then sealing this juncture with mercury, and further, reinforcing the joint with wax; but to persons familiar with the construction and operation of vacuum electric apparatus, it is obvious that while temporarily operative, such sealing-in devices are quite inadequate, especially so as contrasted with the simple and effective sealing which can be secured between ordinary glass and small platinum leading-in wires. Indeed, the latter has been, so far as we know, the only thoroughly adequate and satisfactory vacuum seal between metal and fragile vitreous material.

We are aware that it has been proposed to vary the composition of a silica vacuum electric container by producing a continuous gradation of the composition of the vitreous material from the substantially pure silica of which the body of the container is composed down to a glass having a coefficient of expansion sufficiently high to make it amenable to the sealing in of a metal lead. It has been suggested thus to admix with the silica of which the container is composed a proportion of calcium and potassium oxids in constantly increasing quantity and such a suggestion is embodied in United States Patents Nos. 910,969 and 910,736. We do not know of any instance in which the suggestions of these patents have been carried into practical effect and we should expect that considerable, if not insuperable, difficulties would be encountered in any attempt to practice the suggestion contained in these patent specifications. For instance, it is well known that both potassium and calcium when present even in very small quantities in a glass, produce therein a high thermal coefficient of expansion, and we should expect that the presence of very small quantities of such ingredients in a region adjoining substantially pure silica would produce such discrepancies in rate of expansion as inevitably to rupture the vessel.

The lowest thermal coefficient of expansion of any glass heretofore known to us lies in the neighborhood of $3 \times 10^{-6}$. Between glasses having this coefficient and fused silica having a coefficient of expansion of $.6 \times 10^{-6}$ no glasses have been procurable or have existed so far as we know. The composition of glasses having a coefficient of expansion higher than $3. \times 10^{-6}$ is, of course, well within the knowledge and skill of those who are familiar with glass manufacture.

It is obvious that any attempt to fuse a glass having a coefficient of expansion even as low as $3. \times 10^{-6}$ directly to silica would, if the fusion were effected, result in the development of rupturing stresses as soon as the joint members cooled. In order to construct a fused, hermetical vitreous joint, it has been necessary for us to produce a glass of which the coefficient of expansion, while slightly larger than that of silica, is not so much greater as to produce rupturing stress on cooling the joint members. Moreover, the wide interval between the fusing point of silica and that of ordinary glass which softens below 500° C., makes it obvious that glasses heretofore known cannot be successfully fused to silica wholly irrespective of the inevitable destruction of such a joint (could it be made) by reason of irreconcilable differences in coefficient of expansion.

We have discovered that if titanium oxid ($TiO_2$) be added to and fused with silica in proper proportions, a glass will be produced having sufficiently high melting point and sufficiently low coefficient of expansion as to be adapted to be joined hermetically by fusion to a vessel constructed of pure silica, and further, that by increasing the proportion of titanium oxid, the coefficient of expansion of the resulting glass will be raised and its fusing point lowered. The coefficient of expansion of the compound glass can by this means be increased so that the resulting composition has a coefficient of expansion in the neighborhood of that of porcelain. We have discovered also that the properties of the vitreous composition characterized by a content of titanium oxid may be improved by the addition of boric oxid ($B_2O_3$) or vanadium oxid ($V_2O_5$), and that both of these ingredients can be added to advantage. The boric oxid facilitates the interfusion of the different ingredients and the vanadium oxid increases the range of viscosity of the resulting glass and toughens the final product. Apparently the presence of titanium oxid and vanadium oxid serves to prevent the boric oxid from volatilizing before the silica, which forms the basis of the glass, has thoroughly fused and gone into solution.

To compound a titanium silica glass suited to formation of a hermetically fused joint with pure silica, we recommend the following formula: $SiO_2$ 81%, $TiO_2$ 7%, $V_2O_5$ 3%, $B_2O_3$ 9%.

To make a vitreous composition of the same general character which, however, shall have a coefficient of expansion about equal to that of porcelain, we recommend the following formula: $SiO_2$ 70.6%, $TiO_2$ 13.7%, $V_2O_5$ 1.96%, $B_2O_3$ 13.74%.

By making a mixture of the same ingredients in proportions intermediate between those named in the foregoing formulæ, or by fusing together equal quantities of glasses made by the two different formulæ, a glass may be compounded which will make a fused joint successfully with either of the glasses made according to the formulæ above given. Thus, porcelain may be joined and sealed to a vessel made of silica by first fusing the titanium silicate glass of the first formula to the silica itself and then in succession fusing the other two titanium silicate glasses, and finally fusing the porcelain to the glass representing the second formula above given.

In order to manufacture joints and seals of this character, our preferred mode is to prepare a number of tubes of the titanium silicate glasses made according to formulæ which supply suitably graded steps of expansion-coefficient and to cut these tubes into rings of suitable length. These rings may then be fused in succession, the first one to the tubular end of a vessel composed of silica, and the others in succession, building up a tube composed of successive zones each having a coefficient of expansion slightly higher than that of its predecessor and no two juxtaposed zones differing so largely as to coefficients of expansion as to produce rupturing stresses.

Our invention may be better understood by reference to the drawing hereto annexed which represents a portion of a mercury-arc lamp tube with a sealing extension built up of zones of vitreous material in the manner above indicated.

In this drawing a represents one end of a fused quartz or silica tube. The face of this tube around its opening is suitably ground off so as to be fairly flat, and a ring segment b of a titanium silicate glass composed according to the first of the above given formulæ, is fused to the silica. The zones represented by c and d are built up by taking ring segments first of a titanium silicate glass made as above described by using a formula intermediate between those given in detail, while the segment d is composed of a glass made according to the second formula.

In order to provide a suitable number of safe steps or intervals in the ascending series of coefficients of expansion, and to provide at the end of the series a glass having a coefficient of expansion high enough to make an adequate vacuum seal with a leading-in wire, such as $n$, which may as usual be composed of platinum, the succession of zones or steps from the zone marked $d$ upward may be compounded as follows: The zone or ring $e$ is a glass containing 50% of the composition represented by zone $d$ and any sodium-magnesium-borosilicate glass of low coefficient of expansion which may be obtained in the market. The zone $f$ is composed simply of such a borosilicate glass. In compounding the glass for zones from $g$ to $l$ the borosilicate glass is mixed with increasing proportions of common soda or lead glass, these proportions being so determined that several differences in coefficient of expansion between one zone and the next shall lie within safe limits. Finally, a cap $m$ of common lead or soda glass is fused to the zone $l$ and the platinum lead $n$ is fused into the cap $m$. A mercury electrode M is introduced into the tube and the other electrode being similarly provided with a seal of the character just above described, the apparatus is prepared and completed in the usual manner. Composite seals of the above described character will render it feasible to substitute silica for glass in any vacuum electric apparatus which has heretofore been constructed of glass.

What we claim and desire to secure by Letters Patent is:

1. The combination with a fused silica vessel, of a series of zones of vitreous material fused in juncture, the first constituted and adapted to permanent fused juncture with the silica and fused thereto, the last constituted and adapted to seal over a metallic lead, the thermal coefficients of expansion of the several zones in series graded in steps from the first upward, the diversity between the thermal coefficients of any two joined members being less than that sufficient to produce rupturing stresses at the junctures.

2. The combination with a fused silica vessel, of a series of zones of vitreous material fused in juncture, the first fused in juncture with the silica, being a silica qualified by a content of titanium oxid, the last constituted and adapted to seal over a metallic lead, and a metallic lead sealed therein, the thermal coefficients of expansion of the several zones in series being graded in steps from the first upward, the diversity between the thermal coefficients of any two joined members being less than that sufficient to produce rupturing stresses at the junctures.

3. The combination with a fused silica vessel, of a series of zones of vitreous material fused in juncture, the first fused in juncture with the silica being a silica qualified by a content of titanium oxid, and succeeding zones being silica qualified by progressively larger proportions of titanium oxid, the last zone constituted and adapted to seal over a metallic lead, the thermal coefficients of expansion of the several zones in series being graded in steps from the first upward, the diversity between thermal coefficients of any two joined members being less than that sufficient to produce rupturing stresses at the junctures.

Signed by us at Boston, Massachusetts this third day of April, 1911.

FREDERICK G. KEYES.
CHARLES A. KRAUS.

Witnesses:
ODIN ROBERTS,
CHARLES D. WOODBERRY.